Figure 1:
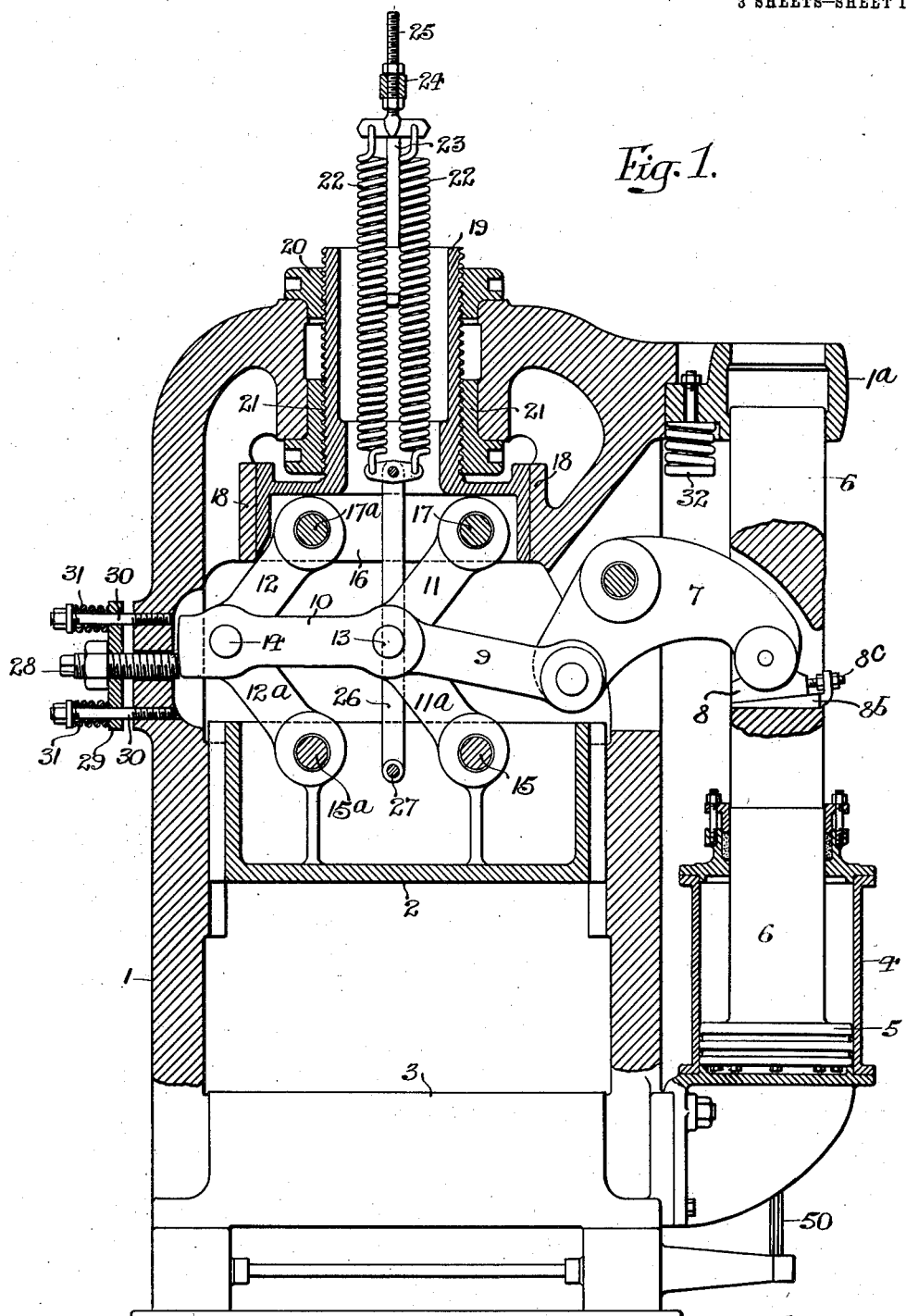

H. E. DERBYSHIRE & A. A. LONGAKER.
POWER PRESS.
APPLICATION FILED FEB. 2, 1910.

986,809.

Patented Mar. 14, 1911.

3 SHEETS—SHEET 1.

Witnesses:

Inventors:
Henry E. Derbyshire,
Albert A. Longaker,
by their Attorneys
Howson & Howson

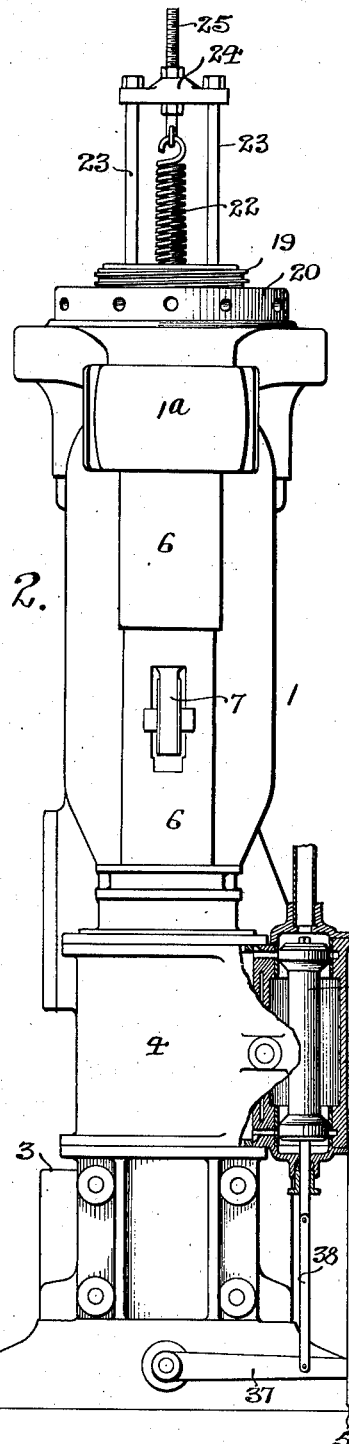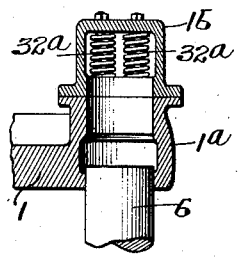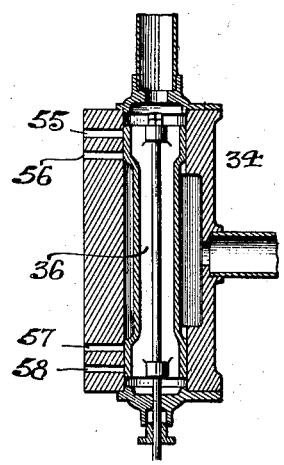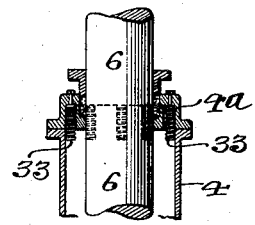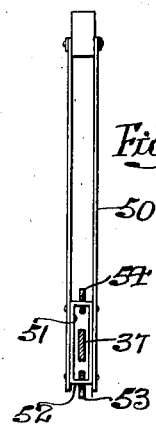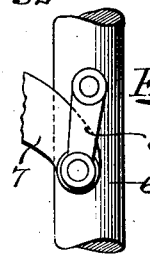

H. E. DERBYSHIRE & A. A. LONGAKER.
POWER PRESS.
APPLICATION FILED FEB. 2, 1910.
986,809.
Patented Mar. 14, 1911.
3 SHEETS—SHEET 3.
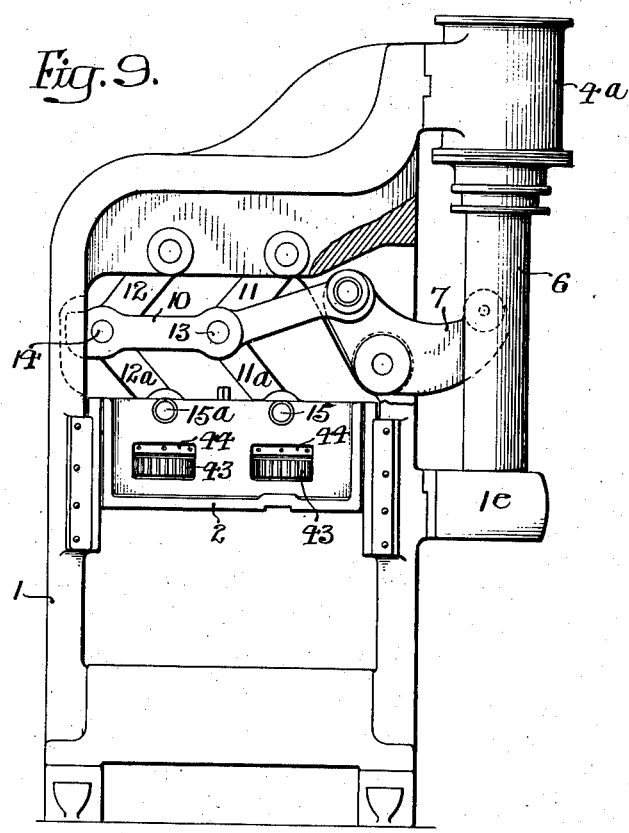
Fig. 9.
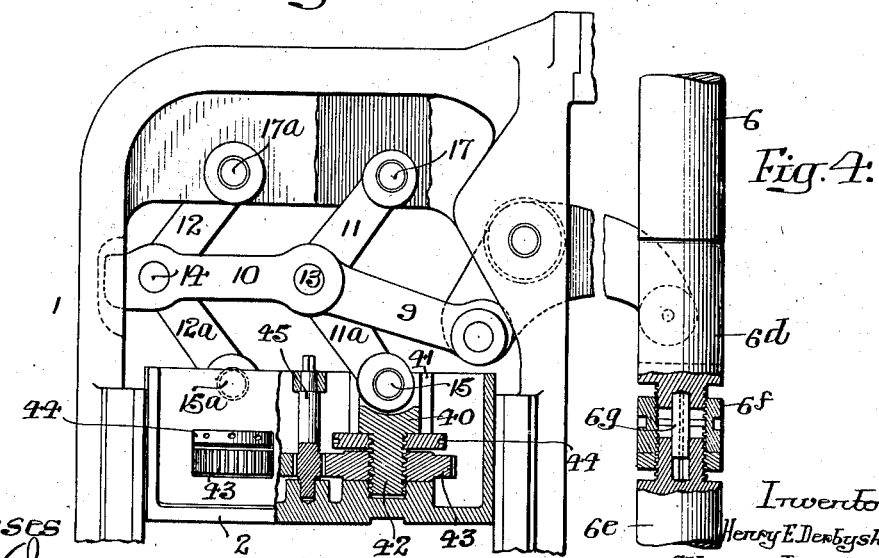
Fig. 3.
Fig. 4.
Witnesses
Titus H. Irons
Walter A. Burrows
Inventors
Henry E. Derbyshire
Albert A. Longaker
by their Attorneys
Howson + Howson

UNITED STATES PATENT OFFICE.

HENRY E. DERBYSHIRE AND ALBERT A. LONGAKER, OF CHAMBERSBURG, PENNSYLVANIA, ASSIGNORS TO CHAMBERSBURG ENGINEERING COMPANY, OF CHAMBERSBURG, PENNSYLVANIA, A CORPORATION OF PENNSYLVANIA.

POWER-PRESS.

986,809.          Specification of Letters Patent.      Patented Mar. 14, 1911.

Application filed February 2, 1910. Serial No. 541,473.

*To all whom it may concern:*

Be it known that we, HENRY E. DERBYSHIRE and ALBERT A. LONGAKER, both citizens of the United States, residing in Chambersburg, Pennsylvania, have invented certain Improvements in Power-Presses, of which the following is a specification.

One object of our invention is to provide a power press including a head in which is carried the die or dies for punching, shearing, or forming blanks, of such construction that it does not require line shafting, has no revolving parts or clutches and consumes power only while work is being done; the arrangement of parts being such that the amount of power required is a minimum and the cost of operation of the machine is relatively low.

We further desire to provide a power press which in addition to being simple and substantial in construction and economical in operation, shall be conveniently adjustable to suit various classes of work as well as to permit of its operation with the minimum expenditure of work.

We also desire to provide a power press which shall be of such a construction as to permit of the adjustment of the length of stroke of its sliding head as well as the range of such stroke, and shall also include means for cushioning its various parts.

These objects and other advantageous ends we secure as hereinafter set forth, reference being had to the accompanying drawings, in which:—

Figure 1, is a vertical section illustrating the detail construction of the preferred form of our invention; Fig. 2, is a front elevation of the machine shown in Fig. 1, the valve mechanism being in section; Figs. 3 and 4 are fragmentary vertical sections illustrating two devices for adjusting the range of movement of the cross head; Fig. 5, is a modification of the means for connecting the piston rod to the bell crank lever, as employed in our invention; Figs. 6 and 7 are vertical sections illustrating two constructions for cushioning the stroke of the piston; Fig. 8, is a vertical section illustrating a modified form of valve particularly designed to automatically cushion the piston; Fig. 9, is a modified form of our invention showing the cylinder as inverted, and Fig. 10, is a front elevation of the device for regulating the amount of opening of the valve.

In the above drawings, 1 represents the main frame of the machine in which is mounted a vertically slidable head 2, to which may be connected in any desired manner the various dies or other attachments for shearing, punching, bending, forming or trimming; there being in each instance suitable co-acting elements mounted on the base 3 of the press.

Mounted on the frame of the machine and to one side of the same, is a cylinder 4 having a piston 5 to which is connected a rod 6 passing through the upper head of said cylinder and guided in an extension or bracket 1$^a$ carried by the frame. A bell crank lever 7 is pivoted to the frame adjacent the piston rod 6 and has one of its arms movably connected to said piston through a slipper 8 mounted within a suitable slot or recess in said piston rod. The other arm of the lever 7 is connected through links 9 and 10 to two toggles formed by two pairs of links 11, 11$^a$, 12, and 12$^a$, respectively connected to each other by pivot pins 13 and 14. The lower toggle links 11$^a$ and 12$^a$ are connected to the sliding head 2 by pins 15 and 15$^a$, while the upper links are pivotally connected to an adjustable head 16 by means of pins 17 and 17$^a$. Said head is vertically movable in guides 18 formed in the upper portion of the frame 1 and has an upwardly projecting extension 19, externally threaded for the reception of adjusting nuts 20 and 21 revolubly mounted in the top of the frame 1 so as to be capable of being turned by a spanner or other suitable wrench.

The slidable head 16 is hollow as well as open at the top and bottom, and through it passes a pair of springs 22 adjustably supported on said head by a yoke formed of rods 23, a cross piece 24, and an adjusting screw 25. The lower ends of these springs are connected through links 26 and a cross pin 27 to the sliding head 2; the arrangement being such that said springs return or tend to return said head to its raised position after each downward stroke.

In the side of the frame 1 adjacent the outer end of the link 10, we mount a toggle-limiting screw 28 which passes loosely through the side of the frame so that its inner end may be engaged by said link under certain conditions. This screw is threaded through a bar 29 mounted upon two bolts 30 screwed into the frame 1 and having between the bar 29 and their heads two springs, indicated at 31.

By turning the screw 28 so that it is moved inwardly, the position of the link 10 and therefore of the toggles and other parts connected thereto, may be adjusted so that under normal conditions, the head is retained in a more or less lowered position; that is to say, the toggles are held by the said screw in a more or less straightened condition and said head, when moved upwardly, is brought to rest without shock by reason of the cushioning effect due to the striking of the end of the link 10 on the screw 28 which is yieldingly supported by means of the springs 31.

In order to limit and cushion the upward movement of the piston and of the arm of the bell crank lever connected thereto, we mount on the frame 1 a spring 32 designed to be engaged by said lever arm at the upper limit of its movement.

Other means of cushioning the upstroke of the piston and the parts connected thereto are shown in Figs. 6 and 7, in the first of which we have provided a pair of springs 32$^a$ mounted immediately above the end of the piston rod 6 within a cap or frame 1$^b$ carried on the guiding bracket 1$^a$, so that the upper end of the piston rod strikes these springs and compresses them at the upper limit of its movement. In the form of the invention shown in Fig. 7, there is mounted in the head 4$^a$ of the cylinder 4 a series of springs 33 designed to be engaged by the piston itself as this approaches the upper end of its stroke, so as to stop the movement of said piston and of the parts connected thereto without shock.

For controlling the admission of motive fluid to the cylinder 4, we provide a valve 34, preferably though not necessarily, of the piston type; and consisting of a casing 35 having within it the valve proper 36 to which a treadle 37 is connected through a link 38. Said treadle is normally retained in a predetermined elevated position by means of a spring 39 so that the valve is ordinarily closed; the construction being such that the fluid under pressure is admitted to the central part of the valve casing. When, however, the treadle is depressed by the foot of the operator, the valve proper 36 is moved downwardly and the motive fluid is admitted to the lower end of the cylinder 4 under the piston 5; this latter is then forced upwardly, turning the bell crank lever on its pivot and straightening the two pairs of toggles so that the slidable head 2 is moved downwardly against the action of the springs 22 and causes the die or other device connected to it, to operate on the work presented to the same.

As before noted, the upward movement of the piston and of its connected parts may be limited in any of a number of ways and by moving the screw 28 inwardly previous to the operation of the machine, the head 2 may be brought into such position that but relatively little movement of this or of the parts connected to it is necessary to cause it to complete its stroke.

As shown in Fig. 5, we may connect the lever 7 to the piston rod 6 by means of one or more links 8$^a$ in place of the slipper construction shown in Fig. 1. This latter is preferably so designed as to be capable of adjustment by means of a wedge 8$^b$ which is formed with an extension on its thick end upturned for the reception of a bolt 8$^c$ connected to the slipper 8. By means of suitable nuts on this bolt, the wedge may be moved in or out as desired, to take up wear, and may be retained by them in any adjusted position. The range of the stroke of the sliding head 2 may be regulated as desired by turning the two nuts 20 and 21 and thereby causing the toggle bearing head 19 to be moved up or down as desired.

In Fig. 3, we have shown another construction for adjusting the range of movement of the sliding head 2, and for this purpose, we mount the toggle pins 15 and 15$^a$, Fig. 3, in yokes 40 which are guided in the sliding head by projections or gibs 41 designed also to take the thrust of the toggle members 11$^a$ and 12$^a$. The yokes 40 have threaded stems 42 on which are threaded adjusting nuts 43 having gear teeth formed in their peripheries. There is also on each of the stems 42, a check nut 44 for retaining the parts in any adjusted positions. The teeth of both of the nuts 43 mesh with the teeth of pinion 44$^a$ carried on a spindle 45 provided with a squared head for the reception of a suitable wrench. By turning said spindle, the two nuts 43 are also turned and, with the check nuts 44 properly loosened, the threaded spindles of the yokes 40 are moved into or out of the sliding head so that its position in the frame and therefore its range of movement under operating conditions, is varied.

The same result is obtained by the construction shown in Fig. 4, where the piston rod 6 is made in two adjustably coupled parts 6$^d$ and 6$^e$. The adjacent ends of these two parts are threaded for the reception of an adjusting nut 6$^f$, while the connection is reinforced by a central dowel pin 6$^g$. The nut 6$^f$ is of such length that the two parts of the piston rod may be moved apart or drawn together by turning the lower part 6$^e$ with the pinion set at the bottom of its stroke, the toggle arms being thus adjusted so as to occupy any desired relation to said piston.

In the case illustrated in Fig. 9, we have shown the operating cylinder 4$^a$ as mounted on the upper part of the frame 1 of the machine so that the piston rod extends downwardly therefrom and is guided in a bracket 1ᵉ at about the middle point of said machine. In this case the lever 7 is preferably inverted so that its two arms extend upwardly instead of downwardly as in Fig. 1.

To adjust the controlling valve so that the amount of motive fluid admitted to the cylinder when the treadle is depressed may be varied, we provide the device shown in Figs. 2 and 10. This consists of a pair of links 50 suspended from the casing of the valve 34 and connected at their lower ends by transverse members 51 and 52. The treadle 37 extends through the guideway formed by these links and their connecting members and we mount in these latter, two set screws 53 and 54, whereby the range of movement of the treadle and hence the amount of movement given by it to the valve 36, may be limited.

As shown in Fig. 8, the valve 34 may be provided with such an arrangement of ports 55, 56, 57, and 58 as will, in combination with the piston 5 and the valve 36, cause the motive fluid to cushion each end of the stroke thereof.

I claim:—

1. The combination in a press of a frame; a head slidably mounted therein; a plurality of toggles connected between the frame and said head; a bell crank lever mounted on the frame; links connecting together one arm of said lever and the toggles; a cylinder mounted on the frame; a piston; and a piston rod connecting said piston with the second arm of the lever; with means for controlling the admission of motive fluid to the cylinder.

2. The combination in a press of a frame; a head slidably mounted therein; toggle mechanism mounted between the frame and the head; a lever pivoted to the frame and operatively connected to the toggle mechanism; a cylinder having a piston; and a piston rod connected to said lever; with means for adjusting the connection between the toggle mechanism and the frame to vary the range of movement of the sliding head.

3. The combination in a press of a frame; a head slidably mounted therein; toggle mechanism mounted between the frame and the head; a lever pivoted to the frame and operatively connected to the toggle mechanism; a cylinder having a piston; a piston rod connected to said lever; and mechanism for adjusting the length of stroke of the sliding head.

4. The combination in a press of a frame; a head slidably mounted therein; toggle mechanism mounted between the frame and the head; a lever pivoted to the frame and having one arm connected to said mechanism; a cylinder; a piston; a piston rod connected to the piston; means for adjusting the range of movement of the sliding head; and mechanism for varying the length of stroke of said head.

5. The combination in a press of a frame having a slidable head; toggle mechanism mounted between the head and the frame; a cylinder; a piston therefor operatively connected to the toggle mechanism; a valve for controlling the admission of motive fluid to the cylinder; a treadle operatively connected to the valve; and means for adjustably limiting the movement of the treadle.

6. The combination in a press of a frame; a head slidably mounted therein; a toggle mounted between the head and the frame; and means for actuating said toggle; with a device for bodily adjusting the positions of the toggle links in the frame.

7. The combination in a frame of an adjustable head; a toggle having one of its links attached to said head; a slidable head attached to the other of the toggle links; a lever pivoted to the frame and having one of its arms connected to the toggle; a cylinder; and a piston therein connected to the other arm of the lever.

8. The combination in a frame of a head; a toggle having one of its links attached to said head; a slidable head attached to the other of the toggle links; a lever pivoted to the frame and having one of its arms connected to the toggle; a cylinder; a piston therein connected to the other arm of the lever; and means for regulating the position of the toggle links when these are in their broken positions.

9. The combination in a press of a frame; a head slidably mounted in said frame; toggles connected between said head and the frame; a spring normally maintaining the toggles in their broken positions with the head raised; a lever pivoted to the frame and connected to the toggles; a cylinder; and a piston in the cylinder connected to said lever.

In testimony whereof, we have signed our names to this specification, in the presence of two subscribing witnesses.

HENRY E. DERBYSHIRE.
ALBERT A. LONGAKER.

Witnesses:
WILLIAM H. FREET,
M. ALICE FROMMEYER.